3,150,109
FILLED POLYURETHANE FOAMS AND METHOD FOR MAKING SAME
Thomas H. Ferrigno, Metuchen, N.J., assignor to Minerals & Chemicals Philipp Corporation, Menlo Park, N.J., a corporation of Maryland
No Drawing. Filed Aug. 1, 1961, Ser. No. 128,389
8 Claims. (Cl. 260—2.5)

The present invention relates to the class of polyurethane cellular plastics characterized by an open or intercommunicating cell structure and is a continuation-in-part of copending application, Serial No. 817,476, filed June 2, 1959, now abandoned.

One of the most outstanding advances in the plastics industry during the past decade has been the development of polyurethane foams which are cellular plastic materials formed by the reaction of long chain polyol compounds and organic polyisocyanates. Cellular plastics are available in various degrees of rigidity, ranging from soft, flexible foams useful in cushioning, clothing interliners, rug underlays, sponges and bath mats; semirigid foams, useful particularly as crash pads; and rigid foams for structural and insulation purposes. The final properties of the urethane foams depend principally on the choice of polyester, polyethers or other long chain polyhydroxyl compound which is converted by the polyisocyanate into a high molecular weight polymer which is then foamed by a suitable foaming system, usually by reaction of water with the free isocyanate content of the polymer, resulting in the formation of carbon dioxide which expands the resin into the desired cellular plastic. The control of branching in the reactants permits an extremely wide range of properties in the final foamed plastic. The density of the foam is controlled to a great extent by the amount of water employed. The configuration of the cell depends principally on the equivalent weight of the long chain polyhydroxyl reactant, with the lower equivalent weight polyhydroxyl materials favoring the production of a closed cell structure and the higher equivalent weight polyhydroxyl materials leading to the open cell structure. The degree of branching of the polyhydroxyl reactant also influences the cell character.

The flexible and semirigid foams are processed for the aforementioned applications in a manner such that the foam has a low density, usually from about 1.25 to 4 pounds per cubic foot, and preferably as low a density as is consistent with the provision of a product of adequate strength, etc. Moreover, such flexible and semirigid foams should have an open celled structure for most applications, which is to say that essentially all (i.e., at least about 90 percent) of the cells are intercommunicating since such a foam configuration is essential to the realization of acceptable foams for cushioning, clothing interliners, crash pads or the like. Rigid foams, in contradistinction, may have varying density values ranging up to 30 pounds per cubic foot or higher, and usually have a closed cell structure.

Many advances have been made in the field of polyurethane chemistry with a view to improving processing techniques and the properties of the ultimate foamed product. Despite the refinements in processing and reduced cost of raw materials, a serious drawback to the use of polyurethane foams is their high cost which reflects particularly the expense of the polyisocyanate reactant. An obvious expedient for lowering the cost of polyurethane foamed products would be to extend the foam produced by a unit volume of prepolymer with low cost filler materials, such as are extensively used in other plastic applications. Such a filler, to truly extend the foam volume, should increase the volume of foam produced by foaming the prepolymer by at least that foam volume produced by foaming a volume of liquid prepolymer equivalent to the volume of extender used. At any rate, the ultimate foam density of the filled foam should be not much greater than that of the unfilled foam since foams are generally employed on a volume basis and increase in foam density increases the cost of foam required for a particular application. Moreover, the use of the filler should not adversely affect other physical properties, such as compression set, deflection, tear strength and cell structure.

The open cell flexible and semirigid foams are commercially prepared without fillers. Certain finely divided inorganic materials have been advocated for imparting special properties, such as shrink resistance, improved compression set and increased density to various types of polyurethane foams. However, in the case of the low density open celled polyurethane plastics, which are produced by water foaming a liquid polyurethane prepolymer using a tertiary amine catalyst, it has been found that fillers adversely affect density and cell structure when incorporated in the foamable polyurethane composition in appreciable quantity such as 10 percent by weight or more. For example, fine silica, viz., silica finer than 1 micron and particularly silica finer than 0.015 to 0.020 micron, is used in small quantities in the production of some low density polyurethane foam compositions for the purpose of improving the compression set or reducing shrinkage of the foamed product. However, greater quantities of such silica cannot be incorporated in the foam structure inasmuch as the resultant foam will be too dense and have poor texture. Similar effects are noticed when filler grades of other minerals are included in foamable polyurethane formulations. Thus, fine filler grades of kaolin clay markedly increase the density of the normally open celled low density polyurethane foam when incorporated therein in appreciable amount, usually causing nonuniformity in the cell structure and loss of mechanical strength; in many cases, use of such clay, as well as other fillers, causes complete or partial collapse of the foam. Thus, such kaolin clay fails to function as a foam extender.

Accordingly, an object of the present invention is to provide open celled flexible and semirigid polyurethane foam compositions containing inorganic filler material which will overcome the aforementioned difficulties.

Another object of the invention is to provide open celled low density polyurethane foam compositions containing finely divided inorganic solids as a filler therefor, which compositions possess characteristics such as: reduced cost, as a result of an increase in foam volume provided by foaming a unit of polyurethane polymer; physical properties as good or better than the unfilled foam compositions; and excellent stability and compression characteristics.

These and further objects and features of my invention will be readily apparent from the description thereof which follows.

I have discovered, in connection with the provision of low density open celled polyurethane plastics by foaming a catalyzed liquid polyisocyanate-polyol prepolymer that important results are realized by utilizing as the filler pigment particles which have been previously coated with certain organic materials of a class hereafter set forth.

Briefly stated, my invention contemplates the use as a filler or extender for open celled polyurethane foams of pigments, the particles of which have been uniformly coated with a strongly adherent film of an amine alcohol selected from the group consisting of tertiary alkanolamines containing only alkyl and alkanolamine groups having from 1 to 4 carbon atoms and at least 2 carbon atoms per amine group, and acetate salts of primary, secondary and tertiary amine containing only alkyl and alkanol groups having from 1 to 4 carbon atoms. The precoated pigment particles are added to a foamable liquid polyisocyanatepolyol prepolymer prior to foaming the prepolymer by incorporating water and the usual catalysts (e.g., methyl morpholine or other suitable tertiary amine). The physical appearance of the filled foam resembles that of the open celled unfilled counterpart, although microscopic examination will show that the cell walls are thinner in the filled foam. The polyurethane prepolymers I employ are those that normally produce an open celled foam in the presence of a suitable foaming system.

I have found that amine alcohol coated pigments, unlike their uncoated counterparts, can be incorporated in relatively large quantities in the foamed composition without adversely affecting physical properties of the foamed plastic, particularly without increasing appreciably the foam density. In many instances the physical properties, such as compression set, of foams formulated with such coated fillers are superior to those of the unfilled foam. A principal advantage attendant the use of many of the coated fillers is that volume of foam produced by a given weight of polyol-polyisocyanate reaction mixture is increased, usually by more than the volume of foam which would be produced by a volume of liquid prepolymer equivalent to the volume of coated pigment particles so that the pigment acts as a true extender and reduces the cost of a unit volume of foam.

Although I do not wish to be bound by any theory as to how the presence of an amine alcohol film on the pigment particle favorably affects the characteristics of a filled open celled polyurethane foam obtained in the usual manner from prepolymer, water and catalyst, it would seem that the film precludes reaction with or adsorption of the isocyanate by the pigment. Isocyanates are potentially reactive and/or adsorbed by pigments. Thus, pigments, by virtue of their high surface area, generally possess the potential for strong physical adsorption of isocyanates and pigments such as clays, talcs, and zeolites are potentially chemically reactive with isocyanate groups through hydrogen bonding, the active part of the clay or the like presumably being silicate oxygen atoms and/or hydroxyl groups on the surface of the clay particles.

It is interesting to note that although some of the amine alcohol I employ as pigment coating agents are also useful as catalysts for polyurethane propolymer systems, they no longer function as catalysts when precoated on the pigment. Therefore, in producing the filled open celled foams of this invention, the usual catalysts must also be employed in addition to amine alcohol present as a coating on pigment particles. Inasmuch as the tertiary amine alcohol coating on the pigment surface has no significant influence on the reaction mechanism or rate, the normal quantity of catalyst must be added with water incorporated in the mixture of prepolymer and coated pigment. It will not suffice to add the amine alcohol coating separately from the pigment and it is essential to precoat the pigment with amine alcohol to prevent reaction of the coating with the system. Thus, adding a tertiary amine alcohol coating separately from the pigment and also incorporating the usual catalyst, the reaction would be so rapid that carbon dioxide would escape too rapidly to produce the desired foam. Other amine alcohols, viz., those containing a plurality of groups containing active hydrogen, and including, for example, diethanolamine, N-ethylethanolamine, triethanolamine will increase the density of a foamed liquid polyurethane prepolymer when incorporated separately, as described in U.S. 2,850,464 to Mitchell. However, when these particular amine alcohols are precoated on a pigment, in accordance with this invention, the density of the ultimate foamed product is not increased; to the contrary, the foam is as dense as or frequently less dense than the foam would be in the absence of the coated pigment. Therefore, the prior art use of tertiary alkanolamines as catalysts in the production of polyurethane foams and the prior art use of certain secondary alkanolamines as agents to increase the density of polyurethane foams are entirely unrelated to the use of such amines as pigment coating agents, in accordance with this invention.

My invention is applicable, generally, to hydrophilic or water-wettable inorganic pigments and is particularly directed to pigments having a high surface area and possessing base exchange capacity and/or proton acceptor sites, presumably silicate oxygen atoms and/or hydroxy groups on the surface. The latter class of pigments, sometimes described as base exchange adsorbents, are most markedly improved by the amine alcohol surface modification in that in their normal hydrophilic condition they increase materially the foam density and often result in foam collapse when formulated in foamable polyurethane compositions. As examples of high surface base exchange pigments, which are also proton acceptors may be cited clays, natural and synthetic zeolites, talc, oxides and hydroxides of alkaline earth metals, silica, particularly silica zerogels and aerogels. Among the clays, I prefer to use nonswelling clays such as kaolinite, attapulgite, and subbentonites, although swelling clays may be used. Swelling clays or so-called "expanding lattice clays" are flat, platelike structures which expand appreciably in the presence of water to the extent of an increase of at least 25 Angstrom units in the C-axis spacing. Swelling clays, unlike kaolinite and attapulgite, for example, tend to impair the water resistance of foams formulated therewith. Other finely divided pigments which are benefited by surface treatment with the aforementioned alkanolamines include iron oxide, titania, limestone, dolomite and precipitataed calcium carbonate. The surface treatment with alkanolamines permits such pigments to be incorporated in the foam without the increase in foam density normally incident to the use of the uncoated pigment counterpart.

As examples of suitable alkanolamines coating compounds may be cited: monoethanolamine acetatae, diethanolamine acetate, N-ethylethanolamine acetate, N-methyl propanolamine acetate, dipropanolamine acetate, triethanolamine, triethanolamine acetate, N-ethyl diethanolamine, N-methyl diethanolamine, N-ethyl diethanolamine acetate, N-dimethyl ethanolamine, N-diethyl ethanolamine, tripropanolamine, and acetate salts of the aforementioned amine alcohols. It will be noted that the amine alcohols are employed as salts, except in the case of tertiary amines in which case either the free amine or its corresponding salt is employed. As used throughout the description of my invention the terms "amine alcohol" and "alkanolamine" encompass suitable amine salts, as hereinabove set forth.

The pigment particles may be coated with the aforementioned alkanolamines by any method which insures the uniform distribution of the amine on the surface of the pigment particles. For example, the alkanolamine may be blended with the pigment and the mixture hammer milled or ball milled. However, inasmuch as the effectiveness of the amine alcohol coating is related to its uniform distribution on the pigment, the pigment is preferably slurried with an aqueous solution of the amine alcohol and the slurry dried. Regardless of the method of preparation, the coated pigments should be in the form of fine particles, i.e., at least about 99 percent by weight of the particles are finer than 325 mesh Tyler Standard Series. Since products made by wet methods generally consist of aggregates, such aggregates should be broken up to provide the coated pigment particles in the desired finely divided form.

The coated pigments should be substantially dry (less than about 1 percent free moisture) when added to a polyurethane prepolymer inasmuch as water carried by the pigment will react with free isocyanato groups in the system. The term "free moisture" (F.M.) means the weight percent of the pigment eliminated by heating the pigment essentially to constant weight at about 250° F.

The amount of amine alcohol that is employed to coat the pigment is usually between about 1 percent and 30 percent, based on the pigment weight, and is preferably that which will theoretically completely cover the surface of the particle with a monomolecular film; hence, the optimum quantity of coating agent relative to the pigment will depend on the surface area of the pigment. However, good results are realized when only part of the surface is coated with an adherent layer of alkanolamine. Thus, in the case of kaolin, which normally has a surface area between about 3 and 10 square meters per gram, about 1 percent of amine alcohol, based on the dry pigment weight, will suffice although up to about 20 percent of coating agent may be employed. In the case of attapulgite, which has a surface area of about 200 to 220 square meters per gram, larger quantities of coating agent are indicated, e.g., about 5 to 30 percent, based on the dry clay weight. The surface area of a pigment may be determined by a nitrogen adsorption method described by S. Brunauer, P. H. Emmett and E. Teller in their article entitled "Adsoprtion of Gases in Multi-Molecular Layers," on page 309 of the Journal of the American Chemical Society, volume 60, February 1938, using the molecular size data of H. K. Livingston presented in his article entitled "Cross-Sectional Areas of Molecules Adsorbed on Solid Surfaces," on page 569, Journal of the American Chemical Society, volume 66, April 1944.

The amount of coated pigment to be used in the preparation of foamed plastic may vary over a relatively wide range depending principally on the viscosity of the foamable polyurethane prepolymer in which it is incorporated. In general, the coated pigment is used in amount of from about 5 percent to about 40 percent by weight of the polyurethane prepolymer and is more usually used in an amount between about 7.5 percent and about 15 percent, same basis.

The foamable polyurethane prepolymer I employ is one that is normally a liquid and is preferably one that has as low a viscosity under ambient condition as is consistent with the provision of an ultimate foamed plastic of acceptable physical properties. The prepolymer contains free isocyanato groups in excess of that required to react with the hydroxyl groups of the polyol employed in the preparation of the prepolymer and with the water employed in the foaming step. The viscosity of the foamable liquid polyurethane prepolymer is between about 500 and 75,000 cps., although preferably the viscosity is between about 500 and 50,000 cps. I have found that prepolymers having a viscosity greater than about 75,000 cps. may not be filled with adequate quantities of the coated pigment to influence favorably the cost of the finished product. On the other hand, the physical properties of the ultimate foam may be impaired if the viscosity of the prepolymer is less than about 500 cps. All viscosity values refer to determinations made at 25° C.

Suitable polyurethane polymers are the reaction products of long chain polyols and polyisocyanates, as exemplified by the reaction product of an arylene diisocyanate and a polyalkylene ether polyol, the reaction product of an arylene diisocyanate and a saturated polyester resin containing terminal hydroxyl groups, and the reaction product of an arylene diisocyanate and a fatty acid triglyceride having a hydroxyl number of at least 49. All of the aforementioned polyurethane prepolymers are well known to those skilled in the art and their preparation is amply described in the literature. The preparation of the reaction products of arylene diisocyanates and polyalkylene ether polyols, which are particularly useful prepolymers in the practice of my invention because of their low viscosity is described in Technical Data Bulletin 11058, National Aniline Division Allied Chemical & Dye Corporation. Triglycerides having a hydroxyl number of at least 49, e.g., castor oil, may be reacted with arylene diisocyanates, as described in U.S. 2,787,601 to form a suitable liquid polyurethane prepolymer. The ratio of triglyceride hydroxyl groups to isocyanato groups in such polyurethane products is from 0.45:2 to 0.95:2. Other liquid polyurethane compositions containing free isocyanato groups and which produce a plastic foam upon reaction with water may be used.

The particular long chain polyol that is used in the foam preparation is one that normally reacts with the polyisocyanate to produce an essentially linear reaction product which, in the presence of a catalyst, is capable of being foamed to provide an open celled low density cellular polyurethane product. In general, it may be said that suitable liquid long chain polyols have an equivalent weight of at least 200. The term "equivalent weight" as used herein is synonymous with the term "isocyanate equivalent" and is a theoretical value calculated from the hydroxyl and acid values of a polyol according to the formula:

$$\text{Equivalent weight} = \frac{56{,}100}{\text{Hydroxyl value} + \text{acid value}}$$

A preferred class of polyol, because of its low cost and low viscosity characteristics, is that of the so-called "polyethers" which are polyalkylene ether polyols, the reaction products of alkylene diamines, such as ethylene diamine, or polyhydroxyl compounds such as glycerine, with alkylene ethers such as ethylene oxides, propylene oxide or mixtures of propylene oxide and ethylene oxide. Such polyethers have a functionality of at least 2 and an equivalent weight of at least 200, and typically between 865 and 1333. As examples of suitable polyethers may be cited: a condensation product of ethylene diamine and mixed propylene and ethylene oxides, having a functionality of 4 and an equivalent weight of 865; a product prepared from propylene glycol and mixed propylene and ethylene oxides, having a functionality of 2 and an equivalent weight of 1000; the polyglycol ether from glycerine and propylene oxide having a functionality of 3 and an equivalent weight of 1333. Although I prefer to employ polyethers because the low viscosity of polyether-polyisocyanate adducts is conducive to the realization of celled urethane foams extended with relatively large quantities of the coated inorganic filler material, other polyols may be used, particularly those which have a relatively low degree of branching, equivalent weights usually at least about 200, and are otherwise adapted to produce an open celled foam.

Another class of suitable polyhydroxyl compounds that may be used is that of saturated polyesters having terminal hydroxyl groups and low acid numbers (usually below 15); these polyesters are made from a dibasic acid, such as adipic acid, or succinic acid and a dihydric alcohol, such as ethylene glycol, or mixtures thereof. The resultant polyesters are liquid of moderate molecular weight, e.g., 1000 to 2500, terminate in hydroxyl groups and function chemically more or less as high molecular weight polyfunctional alcohols inasmuch as they have low acid numbers and are essentially free from the highly branched, viscous or solid polyesters derived essentially from triols and having low equivalent weights and used in producing rigid, closed celled foams. In addition to polyesters having terminal hydroxyl groups, fatty acid triglycerides having a hydroxyl number of at least 49, e.g., castor oil and derivatives thereof, may be employed as described in U.S. Patent No. 2,787,601. Also useful are dihydroxy triglycerides, which have a lower functionality than the parent triglyceride and a higher equivalent weight, typically about 500 to 600. The triglycerides, particularly the trihydroxy triglycerides, are usually used in conjunction with the aforementioned polyethers or polyols having a molecular weight below 200, as exemplified by ethylene glycol, trimethylolpropane and polyethyleneglycol. Polyols other than those specifically set forth above may be used provided that they normally are capable of forming an open celled foam with the polyisocyanate.

A large number of polyisocyanates may be used in preparation of the cellular urethane products, although preferably the aromatic polyisocyanates, which are more reactive and less toxic than aliphatic polyisocyanates are used. At present 2,4-tolylene diisocyanate, 2,6-tolylene diisocyanate and mixtures thereof, are commercially available. However, other diisocyanates may be used with good results when they are available, as examples of which may be cited methylene-bis-(4-phenyl isocyanate), naphthalene 1,5-diisocyanate and 3,3'-dimethoxy-4,4'-biphenylene diisocyanate.

As is well known to those skilled in the art, the isocyanate is employed in excess of that required to react with all functional groups in the polyol, as well as with all of the water used in the foaming system.

The isocyanato content of the prepolymer is controlled so as to provide more —NCO groups than theoretically required for complete reaction with all water and all functional groups in the polyol. The free —NCO content of the prepolymer is about 5 percent to 20 percent, based on the weight of the prepolymer and is usually about 9 percent. The excess isocyanato groups, which are at the end of the polyurethane chains after the water added to the prepolymer is consumed, can then react with active hydrogen groups, such as urea, urethane, hydroxyl or amide groups within the polymer chain so as to branch linear chains or crosslink branched chains in order that optimum physical properties of the foam may be developed.

The number of free or unreacted isocyanato groups in the polyurethane prepolymer may be determined by adding an excess of n-butylamine and back-titrating excess amine with hydrochloric acid.

The amount of water added to the polyurethane prepolymer containing unreacted isocyanato groups to expand the polymer into a cellular plastic will vary with the properties sought in the foamed plastic and is usually within the range of from about 33⅓ percent to about 95 percent of the unreacted isocyanato groups in the polyurethane prepolymer.

As mentioned, the usual catalysts must be incorporated into the prepolymer-coated pigment mixture since the pigment coating agent is ineffectual as a catalyst when it is held on the pigment surface. The catalyst I use is a water-soluble tertiary amine, such as, for example, pyridine, dimethylhexadecylamine, quinoline, triethylamine and N-methylmorpholine.

It will be distinctly understood that modifications of the so-called "prepolymer" method may be employed in the preparation of the novel pigment extended open celled foams. All of these methods involve the reaction of an arylene diisocyanate with a long chain linear polyol to form a foamable polyurethane product which contains unreacted —NCO groups, and foaming the arylene diisocyanate-polyol adduct in the presence of a catalyst. For example, the isocyanate may be reacted with a portion only of the polyol to provide a polymer having a relatively high —NCO content, e.g., about 30 percent; the coated filler may be added thereto followed by addition of a mixture of remaining polyol, catalyst, water and surface active agent. In such a case, the total quantity of polyol will be such as to provide about a 9 percent free isocyanato content in the mixture. Likewise, other foaming systems may be employed. For example, a metal salt hydrate may be employed in lieu of or in conjunction with water.

Various other materials may be included in the foam composition of my invention, as examples of which may be cited external plasticizers, such as diesters, used to impart flexibility, coloring agents, emulsifiers and surface active agents. The latter class of materials encompass compounds of a wide variety of ionic character, surface activity, etc. It is well known that the cell size, water resistance, resistance to discoloration and chemicals, compression set, etc., may be controlled to a certain extent by the type and concentration of surfactant.

Following are examples which illustrate the superiority of alkanolamine coated pigments over the uncoated counterpart as fillers in polyurethane foams. It will be clearly understood that the invention is not limited to the particular prepolymers and pigments mentioned in these examples. Also the invention is not limited to the specific tertiary amine catalyst used in the examples. In the examples all parts represent parts by weight.

EXAMPLE I

This example illustrates the use, in accordance with the prior art, of various uncoated pigments as fillers in polyurethane foams obtained by catalyzing a liquid polyurethane prepolymer with a tertiary amine catalyst.

1. *Preparation of Polyurethane Prepolymer*

In this example the polyol employed in preparing the polyurethane prepolymer was Niax Diol PPG–2025, which is a linear polypropylene oxide glycol having a molecular weight of 2000 and an hydroxyl number of 56.

2200 parts of the polyether was mixed thoroughly and rapidly with 200.2 parts of 2,4-tolylene diisocyanate (1.05 equivalents per equivalent of polyether) under a dry nitrogen blanket in a stainless steel vessel, resulting in an exothermic reaction. The temperature increased to 158° F. after one hour and was maintained at this temperature for about 2¾ hours at which time viscosity was 15,000 cps. (as measured at 25° C. on a Brookfield viscometer using the #5 spindle). 539 parts of 2,4-tolylene diisocyanate was added to bring the final —NCO content of the prepolymer to 9 percent over a period of about an hour holding the temperature at about 158° F. The batch was then poured in cans flushed with dry nitrogen gas and sealed.

2. *Preparation of Foams*

The prepolymer was mixed with polydimethyl siloxane liquid (a wetting agent), using 100 parts of prepolymer to 0.5 parts siloxane. Various uncoated pigments were added to samples of the prepolymer, using 10 parts of pigment for each 100 parts of prepolymer. The pigment was mixed with prepolymer for 3 minutes under high speed agitation.

To each sample containing 10 parts pigment, 100 parts prepolymer and 0.5 part siloxane, a mixture of 2 parts N-methylmorpholine catalyst and 2.3 parts water was rapidly added. The batch was agitated vigorously for 10 seconds and then immediately poured into a closed mold lined with kraft paper. Fifteen minutes after the forms reached peak height, the foam and form were placed in a forced draft oven at 150° F. for 15 minutes and the forms removed. All foams were postcured for 4 hours at 176° F.

In Table I there is recorded the physical properties of the foamed resins formulated as above described with the various fillers.

Density values reported in Table I were determined by weighing blocks carefully cut to 2 x 2 x 1 inch. These blocks were then used in the 50 percent deflection and percent compression set tests. The compression set test was conducted in accordance with ASTM test D–1564–58, method B, constant deflection. This value represents the percent of the original height of the sample which did not recover in 30 minutes after the sample had been compressed to half its original height for a period of 22 hours at 158° F. The higher values indicate poor resiliency characteristics or loss of resiliency upon aging. The 50 percent deflection test was conducted by loading a balanced board and tin can on the 2 x 2 x 1-inch specimen and filling the can with bird shot until the 1-inch dimension was reduced to ½ inch and remained at this height for 1 minute. The total load was determined and reported as pounds per square inch per 50 percent deflection.

The data representing foam volume in cubic feet was derived by dividing the total batch weight, in pounds, including that of the extender, by the density of the cured foam. If an increase of foam volume was realized, the effect was due to the extender.

As mentioned, a filler to be a true extender for a foamed resin must increase the total foam volume developed from a given weight of prepolymer in an amount at least equal to the volume of foam developed by a volume of liquid prepolymer equivalent to the volume of the filler itself in the foam. Thus, for example, if 100 pounds of an unfilled prepolymer weighing 8.75 pounds per gallon yields 2.59 cubic feet of foam per gallon of prepolymer (or 100 pounds of prepolymer yields a total foam volume of 30.4 cubic feet), then addition of 10 pounds of a mineral filler occupying about 0.465 gallon should increase the foam yielded by 100 pounds of the same prepolymer by 2.59 x 0.465 or about 1.20 cubic feet.

The pigments investigated were as follows: Multiflex MM, which is micronized calcium carbonate (average equivalent spherical diameter 0.055 micron); ASP 200, kaolin clay (average equivalent spherical diameter 0.55 micron); Nytal 400, micronized talc (average equivalent spherical diameter 1.5 micron); Cabosil, a silica aerogel; Attasorb LVM, a calcined noncolloidal grade of attapulgite clay; and Attagel 20, a colloidal grade of attapulgite clay.

TABLE I
[Physical properties of foams filled with uncoated pigments]

| Extender | Density, lbs./cu. ft. | Cu. ft./total formula, lbs. | P.s.i./50% deflection | Percent compression set |
|---|---|---|---|---|
| None (control) | 3.29 | 30.4 | 0.50 | 29.5 |
| Micronized calcium carbonate | 3.56 | 30.9 | 0.57 | 29.5 |
| Micronized talc | 3.89 | 28.3 | 0.58 | 25.0 |
| Silica aerogel | (¹) | | | |
| Kaolin clay | 16.7 | | | |
| Attapulgite (colloidal) | 3.87 | 28.4 | 0.41 | 11.5 |
| Attapulgite (noncolloidal) | 3.82 | 28.8 | | |

¹ No foam.

The data show that the only filler which extended the volume of the foam was the micronized calcium carbonate; however, the effect of the carbonate was minor. The kaolin multiplied the foam density five-fold and the aerogel prevented foam formation.

EXAMPLE II

The effect of coating pigments, including some evaluated in Example I, with amine alcohols prior to incorporating them into the prepolymer system of Example I was examined.

The pigments were coated by adding and mixing the alkanolamines identified in Table II with a 30 percent to 50 percent slip of the extender, drying the slurry at 225° F. to a maximum free moisture content of 2.0 percent, grinding the dried product in a Braun mill pulverizer and passing the pulverized product through a micronizer.

The precoated pigment was initially mixed with the prepolymer containing wetting agent. To each sample containing 10 parts coated pigment, 100 parts prepolymer and 0.5 part siloxane, a mixture of 2 parts N-methylmorpholine catalyst and 2.3 parts water was added, as in Example I. The foams were postcured as in Example I.

The foam characteristics of polyether-based polyurethane foams formulated with 10 parts coated pigment per 100 parts polyurethane prepolymer are evaluated in Table II which follows:

TABLE II
[Physical properties of flexible foams filled with coated pigments]

| Extender | Coating ¹ | Density, lbs./cu. ft. | Cu. ft./total formula, lbs. | P.s.i./50% deflection | Percent compression set |
|---|---|---|---|---|---|
| Kaolin clay | 20.2% monoethanolamine acetate. | 3.54 | 31.1 | 0.61 | 10.5 |
| Attapulgite (colloidal) | ----do---- | 3.58 | 30.8 | | |
| Micronized talc | ----do---- | 3.07 | 35.8 | 0.54 | 12.6 |
| Micronized calcium carbonate. | ----do---- | 3.27 | 33.7 | 0.58 | 12.6 |
| Ground limestone | ----do---- | 3.28 | 33.6 | 0.41 | 11.5 |
| Attapulgite (colloidal) | 14.8% N-dimethyl ethanolamine. | 3.39 | 32.5 | 0.54 | 6.2 |

¹ Percent, based on extender weight.

A comparison of the data in Table II with that of Table I show that in all cases the volume of foams prepared with coated pigments was much greater than those prepared with a like quantity of the uncoated counterpart. Moreover, coating the clay materially improved the compression set characteristics of the pigment filled foams. All of the foams formulated with amine alcohol coated pigments had a fine uniformly open celled structure.

I claim:
1. An essentially open celled plastic foam composition comprising the water-foamed, tertiary amine catalyzed polymerization product of a liquid polyurethane prepolymer containing unreacted —NCO groups which is the reaction product of an arylene diisocyanate and at least one liquid long chain linear polyol selected from the group consisting of a polyalkylene ether polyol having an equivalent weight of at least 200, a saturated polyester resin containing terminal hydroxyl groups, which is the reaction product of a dibasic acid and a dihydric alcohol, and a fatty acid triglyceride having a hydroxyl number of at least 49, and uniformly distributed therein from 10 percent to 40 percent by weight of minus 325-mesh, Tyler Standard, particles of a normally hydrophilic pigment, said pigment particles having previously been uniformly coated with from 1 percent to about 30 percent by weight of an alkanolamine selected from the group consisting of acetate salts of primary, secondary and tertiary alkanolamines having from 1 to 4 carbon atoms in each hydrocarbon group and at least 2 carbon atoms per amine group and tertiary alkanolamines having from 1 to 4 carbon atoms in each hydrocarbon group.

2. The composition of claim 1 in which said pigment is a silicate mineral.

3. The composition of claim 1 in which said pigment is a carbonate of an alkaline earth metal.

4. An essentially open celled plastic foam composition comprising the water-foamed, tertiary amine catalyzed polymerization product of a liquid polyurethane prepolymer containing unreacted —NCO groups which is the reaction product of an arylene diisocyanate and a polyalkylene ether polyol having an equivalent weight of at least 200, and uniformly distributed therein from 10 percent to 40 percent by weight of minus 325-mesh, Tyler Standard, particles of a silicate mineral, said particles being uniformly coated with from 1 percent to 30 percent by weight of an alkanolamine selected from the group consisting of acetate salts of primary, secondary and tertiary alkanolamines having from 1 to 4 carbon atoms in each hydrocarbon group and at least 2 carbon atoms per amine group and tertiary alkanolamines having from 1 to 4 carbon atoms in each hydrocarbon group.

5. An essentially open celled plastic foam composition comprising the water-foamed, tertiary amine catalyzed polymerization product of a liquid polyurethane prepolymer containing unreacted —NCO groups, said prepolymer being the reaction product of an arylene diisocyanate and a polyalkylene ether polyol having an equivalent weight of at least 200, and uniformly distributed therein from 10 percent to 40 percent by weight of minus 325-mesh, Tyler Standard, particles of a nonswelling clay, said particles being uniformly coated with from 1 percent to 30 percent by weight of an alkanolamine selected from the group consisting of acetate salts of primary, secondary and tertiary alkanolamines having from 1 to 4 carbon atoms in each hydrocarbon group and at least 2 carbon atoms per amine group and tertiary alkanolamines having from 1 to 4 carbon atoms in each hydrocarbon group.

6. The composition of claim 5 in which said clay is kaolin.

7. The composition of claim 5 in which said clay is attapulgite.

8. A method of making a filled open celled plastic foam comprising mixing a liquid polyurethane prepolymer containing unreacted —NCO groups, said prepolymer being the reaction product of an arylene diisocyanate and at least one liquid long chain linear polyol selected from the group consisting of a polyalkylene ether polyol having an equivalent weight of at least 200, a saturated polyester resin containing terminal hydroxyl groups, which is the reaction product of a dibasic acid and a dihydric alcohol, and a fatty acid triglyceride having a hydroxyl number of at least 49, with from 5 percent to 40 percent by weight of minus 325-mesh, Tyler Standard, particles of a normally hydrophilic pigment, said pigment particles having previously been uniformly coated with from 1 percent to about 30 percent by weight of an alkanolamine selected from the group consisting of acetate salts of primary, secondary and tertiary alkanolamines having from 1 to 4 carbon atoms in each hydrocarbon group and at least 2 carbon atoms per amine group and tertiary alkanolamines having from 1 to 4 carbon atoms in each hydrocarbon group, mixing the resultant mixture with water and with a tertiary amine catalyst so as to cause said prepolymer to foam and curing the resultant foam, thereby producing a low density filled polyurethane plastic foam.

References Cited in the file of this patent
UNITED STATES PATENTS

| | | |
|---|---|---|
| 2,842,506 | Roussel | July 8, 1958 |
| 2,866,762 | Brochhagen et al. | Dec. 30, 1958 |
| 2,894,919 | Simon et al. | July 14, 1959 |